US010957458B2

(12) United States Patent
Ooka et al.

(10) Patent No.: US 10,957,458 B2
(45) Date of Patent: Mar. 23, 2021

(54) MOVABLE STANDBY HYDRAULIC CONTROL UNIT THAT IS USABLE DURING A CONTROL ROD DRIVE SYSTEM INSPECTION TO TEMPORARILY REPLACE ANY ONE OF SEVERAL HYDRAULIC CONTROL UNITS

(71) Applicant: Hitachi-GE Nuclear Energy, Ltd., Ibaraki (JP)

(72) Inventors: Kento Ooka, Ibaraki (JP); Naoto Misawa, Ibaraki (JP); Hiroshi Okazawa, Ibaraki (JP)

(73) Assignee: HITACHI-GE NUCLEAR ENERGY, LTD., Ibaraki (JP)

( * ) Notice: Subject to any disclaimer, the term of this patent is extended or adjusted under 35 U.S.C. 154(b) by 334 days.

(21) Appl. No.: 15/983,307

(22) Filed: May 18, 2018

(65) Prior Publication Data

US 2018/0358133 A1 Dec. 13, 2018

(30) Foreign Application Priority Data

Jun. 8, 2017 (JP) .............................. JP2017-113114

(51) Int. Cl.
G21C 7/16 (2006.01)
G21C 9/02 (2006.01)
G21C 17/12 (2006.01)
G21C 15/18 (2006.01)
G21C 17/10 (2006.01)

(52) U.S. Cl.
CPC ................ *G21C 7/16* (2013.01); *G21C 9/02* (2013.01); *G21C 15/18* (2013.01); *G21C 17/10* (2013.01); *G21C 17/12* (2013.01)

(58) Field of Classification Search
CPC . G21C 7/16; G21C 9/02; G21C 15/18; G21C 17/10; G21C 17/12
USPC .......................................................... 376/230
See application file for complete search history.

(56) References Cited

FOREIGN PATENT DOCUMENTS

| JP | 60-188883 A | 9/1985 |
|---|---|---|
| JP | 61-167894 A | 7/1986 |
| JP | H01-092693 A | 4/1989 |
| JP | 2000-193778 A | 7/2000 |
| JP | 2000193778 A * | 7/2000 |

OTHER PUBLICATIONS

Great Britain Office Action received in corresponding Great Britain Application No. GB1807965.7 dated Nov. 16, 2018.
Japanese Office Action received in corresponding Japanese Application No. 2017-113114 dated Sep. 8, 2020.

* cited by examiner

*Primary Examiner* — Jack W Keith
*Assistant Examiner* — Daniel Wasil
(74) *Attorney, Agent, or Firm* — Mattingly & Malur, PC (57) ABSTRACT

A control rod drive system and an inspection method of the control rod drive system capable of performing inspection safely and effectively. A control rod drive system controlling operation by supplying a hydraulic pressure to control rod drive mechanisms. A plurality of first hydraulic control units supply the hydraulic pressure to corresponding control rod drive mechanisms and a second hydraulic control unit supplies the hydraulic pressure to corresponding control rod drive mechanisms of the first hydraulic control unit as an inspection target instead of the first hydraulic control unit.

12 Claims, 10 Drawing Sheets

ମOVABLE STANDBY HYDRAULIC
CONTROL UNIT THAT IS USABLE DURING
A CONTROL ROD DRIVE SYSTEM
INSPECTION TO TEMPORARILY REPLACE
ANY ONE OF SEVERAL HYDRAULIC
CONTROL UNITS

BACKGROUND OF THE INVENTION

1. Field of the Invention

The present invention relates to a control rod drive system and an inspection method of the control rod drive system.

2. Description of Related Art

In general, a control rod drive mechanism is an apparatus that drives a control rod for controlling the output of a reactor, and a hydraulic control unit is an apparatus that converts an electrical signal into a hydraulic pressure and supplies a drive force to the control rod drive mechanism.

For example, the control of output in a boiling-water reactor is performed by inserting or pulling out the control rods in addition to the control by a coolant. At the time of emergency stop of the reactor, high-pressure water is supplied from hydraulic control units as drive sources to the hydraulic pressure into the control rod drive mechanisms, thereby urgently inserting the control rods installed at an upper part of the control rod drive mechanisms into a fuel assembly to stop the reactor. To urgently inserting the control rods into the fuel assembly is called a scram in the following description.

Here, to perform the inspection of the hydraulic control unit during a stop period of the reactor is disclosed in JP-A-2000-193778 (Patent Literature 1). As a scram function is temporarily lost during the inspection of the hydraulic pressure control unit, the inspection is performed during the stop period of the reactor for securing safety of the reactor.

It is necessary to stop the reactor for inspecting the hydraulic control unit in related art, and it is necessary to take out the fuel for stopping the reactor. Therefore, a great deal of trouble and time are required for work of taking out the fuel for the inspection and repair work after the inspection in related art.

It can be considered that inspection is performed during an operation period of the reactor in which the fuel is not taken out. However, there is a time limit when inspection is performed in the operation period of the reactor because of constraints of safety regulations, therefore, it is necessary to perform inspection quickly with respect to one hydraulic control unit. As there are many inspection items in the hydraulic control unit, it may be difficult to maintain reliability in inspection to be sufficiently high if work time for the inspection is limited.

SUMMARY OF THE INVENTION

The present invention has been made in view of the above problems, and an object thereof is to provide a control rod drive system and an inspection method of the control rod drive system capable of perform inspection safely and efficiently. Another object of the present invention is to provide a control rod drive system and an inspection method of the control rod drive system capable of inspecting a first hydraulic control unit as an inspection target during the operation period of the reactor while maintaining the scram function of the control rod drive mechanisms by supplying a hydraulic pressure from a second hydraulic control unit instead of the first hydraulic control unit as the inspection target.

A control rod drive system according to the present invention is a control rod drive system controlling operation by supplying a hydraulic pressure to control rod drive mechanisms, which includes a plurality of first hydraulic control units supplying the hydraulic pressure to corresponding given control rod drive mechanisms, and a second hydraulic control unit supplying the hydraulic pressure to corresponding given control rod drive mechanisms of the first hydraulic control unit as an inspection target instead of the first hydraulic control unit as the inspection target selected from the respective first hydraulic control units.

According to the present invention, the second hydraulic control unit can supply the hydraulic pressure to corresponding given control rod drive mechanisms instead of the first hydraulic control unit as the inspection target, therefore, it is possible to inspect the first hydraulic control unit as the inspection target while maintaining the function of the control rod drive mechanisms by the second hydraulic control unit.

DESCRIPTION OF EMBODIMENTS

Hereinafter, an embodiment of the present invention will be explained with reference to the drawings. As described later, in a control rod drive system according to the embodiment, a hydraulic control unit for maintenance 2 as a "second hydraulic control unit" is added so as to be switchable with respect to a normal hydraulic control unit 1 as a "first hydraulic control unit".

According to the embodiment, the hydraulic control unit for maintenance 2 is connected to control rod drive mechanisms 3 instead of the hydraulic control unit 1 as an inspection target, then, the hydraulic control unit 1 as the inspection target is inspected. During the inspection of the hydraulic control unit 1 as the inspection target, the hydraulic control unit for maintenance 2 is connected to the control rod drive mechanisms 3, therefore, the first hydraulic control unit as the inspection target can be inspected while maintaining the scram function. As the scram function can be maintained during inspection work also according to the present embodiment, there are no constraints due to safety regulations and sufficient inspection time can be secured. As a result, maintainability, safety and reliability of the control rod drive system can be improved.

Example 1

A first example will be explained with reference to FIG. 1 to FIG. 6. The following example is one example and the present invention is not limited to a configuration of the example.

Figure 1:
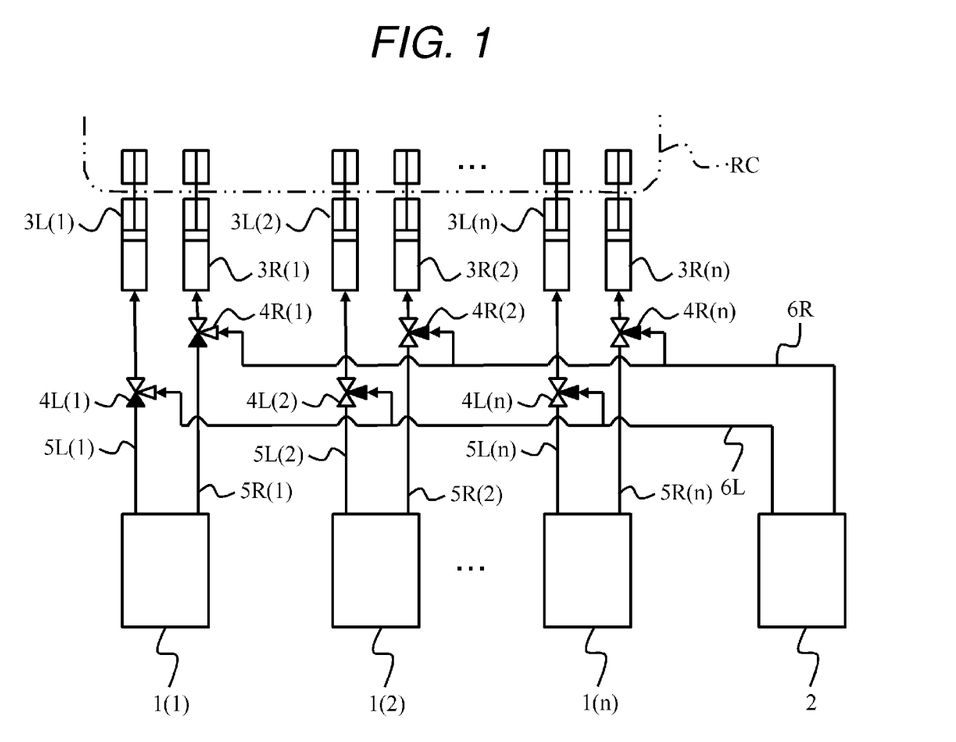
FIG. 1 is an entire configuration diagram of a control rod drive system.

FIG. 1 is an entire configuration diagram of the control rod drive system. The control rod drive system includes, for example, a plurality of hydraulic control units 1(1) to 1(n), at least one hydraulic control unit for maintenance 2, control rod drive mechanisms 3L, 3R, three-way selector valves 4L, 4R, pipes 5L, 5R and pipes for maintenance 6L, 6R.

In the following description, the hydraulic control units 1(1) to 1(n) may be abbreviated as the hydraulic control units 1, the control rod drive mechanisms 3L, 3R may be abbreviated as the control rod drive mechanisms 3, the three-way selector valves 4L, 4R may be abbreviated as three-way selector valves 4, the pipes 5L, 5R may be abbreviated as the pipes 5 and the pipes for maintenance 6L, 6R may be abbreviated as pipes for maintenance 6 when it is not particularly necessary to distinguish these components.

Respective hydraulic control units 1 are connected to the control rod drive mechanisms 3L, 3R through the pipes 5L, 5R. The respective hydraulic control units 1 supply high-pressure water to the control rod drive mechanisms 3L through the pipes 5L and supply high-pressure water to the control rod drive mechanisms 3R through the pipes 5R. The control rod drive mechanisms 3L, 3R are inserted into the inside of a reactor pressure vessel RC from a bottom side thereof, and inserted into a not-shown fuel assembly when the high-pressure water is supplied from the hydraulic control units 1.

The hydraulic control unit for maintenance 2 is configured in the same manner as the hydraulic control units 1, and is connected to the middles of respective pipes 5L, 5R through the pipes for maintenance 6L, 6R and respective three-way selector valves 4L, 4R. The hydraulic control unit for maintenance 2 is connected to the middles of respective pipes 5L (1) to 5L (n) through one pipe for maintenance 6L and respective three-way selector valves 4L (1) to 4L (n). Similarly, the hydraulic control unit for maintenance 2 is connected to the middles of respective pipes 5R (1) to 5R (n) through the other pipe for maintenance 6R and respective three-way selector valves 4R (1) to 4R (n).

Figure 2:
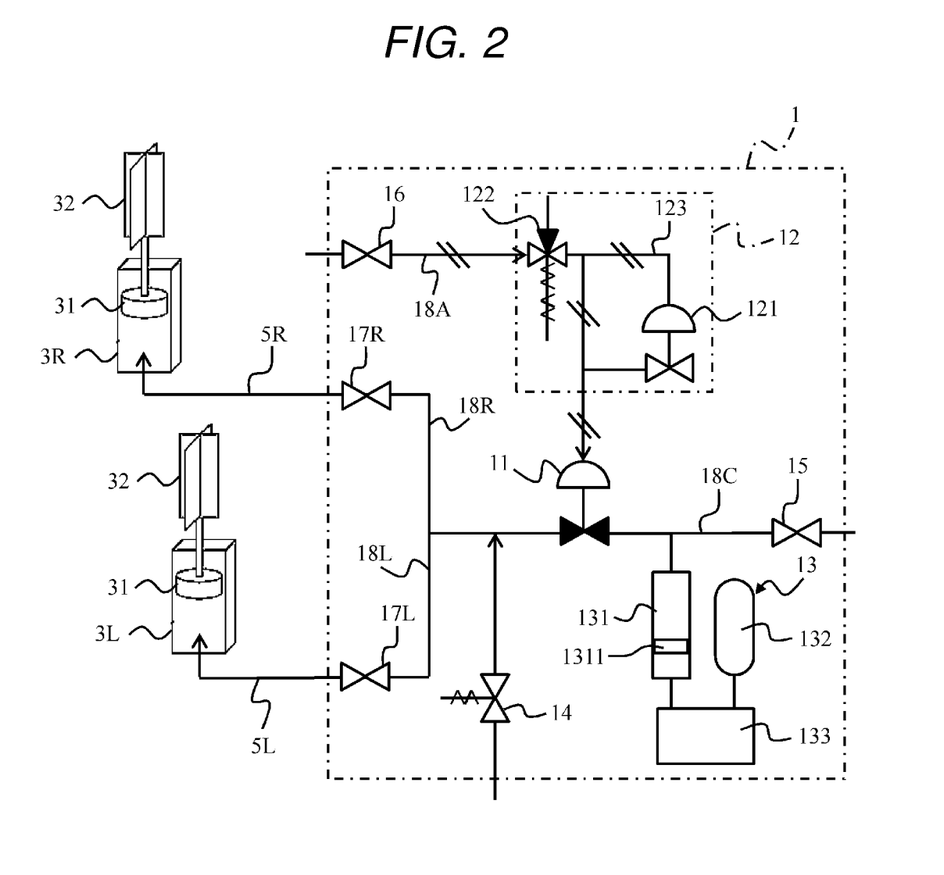
FIG. 2 is a system diagram of a hydraulic control unit at the time of normal operation.
Figure 3:
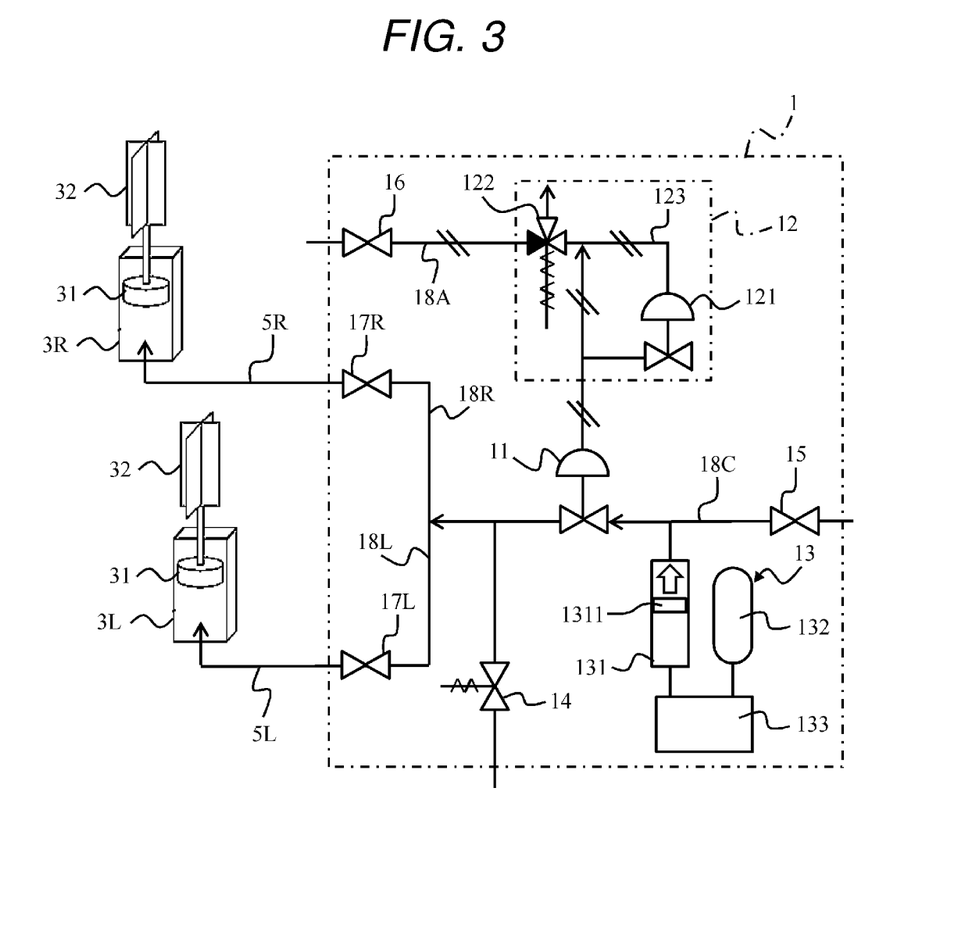
FIG. 3 is a system diagram of the hydraulic control unit at the time of scram.
Figure 4:
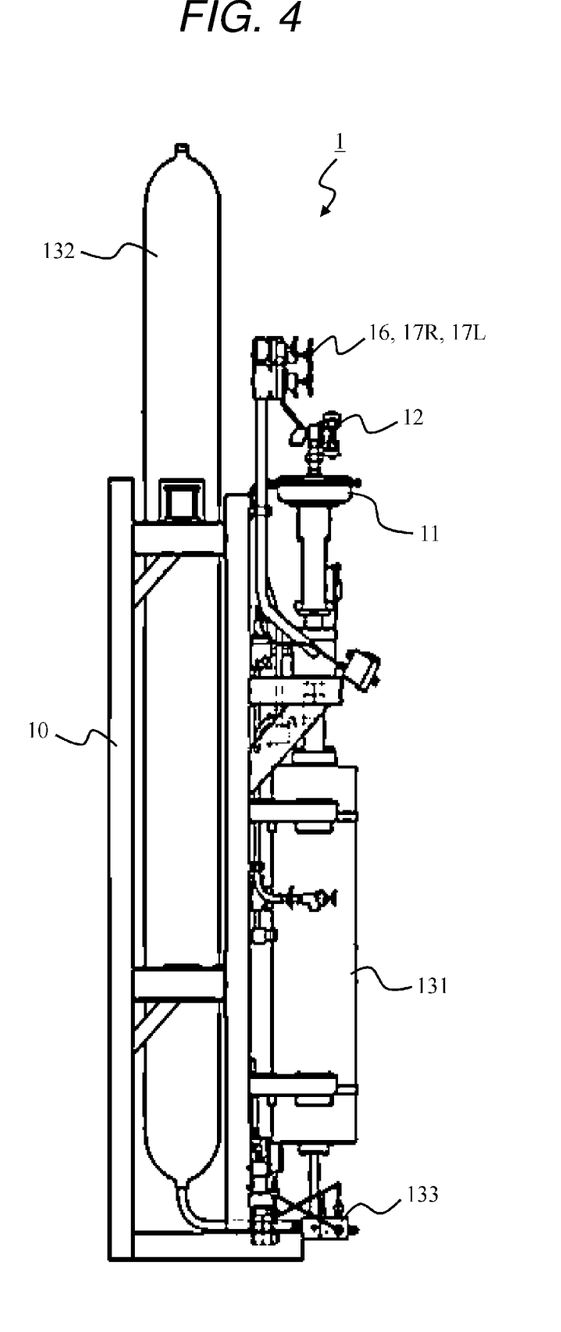
FIG. 4 is an external view of the hydraulic control unit in a boiling-water reactor.

FIG. 2 shows a system diagram of the hydraulic control unit 1 at the time of normal operation. FIG. 3 shows a system diagram of the hydraulic control unit 1 at the time of scram. FIG. 4 shows an external view of the hydraulic control unit 1 in a boiling-water reactor.

The hydraulic control unit 1 shown in FIG. 2 and FIG. 3 includes, for example, an air operated scram valve 11, a scram pilot valve 12, a pressure device 13, a solenoid valve 14, gate valves 15, 16, 17L and 17R and internal pipes 18C, 18L and 18R. The entire hydraulic control unit 1 is supported by a frame 10 as shown in FIG. 4.

In the drawings, a valve open state is represented by a white triangle and a valve closed state is represented by a black triangle. Therefore, the air operated scram valve 11 in FIG. 2 is closed and the air operated scram valve 11 in FIG. 3 is opened. In the following description, the air operated scram valve 11 may be abbreviated as the scram valve 11.

The scram valve 11 is provided in the middle of the pipe 18C, and the high-pressure water supplied to the control rod drive mechanism 3 is controlled by controlling (by opening/closing) a flow path of the pipe 18C. In more detail, an upstream side of the pipe 18C is connected to an external water supply source (not shown) through an upstream-side gate valve 15, and a downstream side of the pipe 18C branches into the pipes 18L and 18R. The pipe 18L is connected to the control rod drive mechanism 3L through the external pipe 5L. Similarly, the pipe 18R is connected to the control rod drive mechanism 3R through the external pipe 5R. The downstream-side gate valves 17L and 17R are respectively provided in the middles of the respective pipes 18L and 18R branching inside the unit.

The scram pilot valve 12 controls opening/closing operations of the scram valve 11 by supplying air pressure for control to the scram valve 11. The scram pilot valve 12 includes, for example, a pressure regulating valve 121, a pressure relief valve 122 and a pilot line 123.

The scram pilot valve 12 is connected to an air supply source (not shown) through an air pipe 18A and the gate valve 16, supplying air from the outside to the scram valve 11 through the three-way selector valve 122. As shown in FIG. 2, while air from the scram pilot valve 12 is supplied to the scram valve 11, a diaphragm (not shown) of the scram valve 11 is pressed downward in the drawing and closes the valve.

The pressure relief valve 122 normally allows the air pipe 18A to communicate with the scram pilot valve 12 to supply compressed air from the external air supply source to the scram pilot vale 12 as shown in FIG. 2. Accordingly, the scram valve 11 maintains the valve closed state.

The pressure device 13 is positioned between the scram valve 11 and the upstream-side gate valve 15 and connected to the middle of the pipe 18C. The pressure device 13 is a device for pressurizing water inside the pipe 18C, and includes, for example, an accumulator 131, a nitrogen container 132 and an instrumentation block 133.

The scram valve 11 is a device for controlling the pressurizing device 13. The scram valve 11 operates when an emergency occurs, and a piston 1311 of the accumulator 131 rises inside the accumulator 131 by high-pressure nitrogen stored inside the nitrogen container 132 and the accumulator 131 to feed water accumulated in the accumulator 131 into the pipe 18C. The high-pressure water supplied to the pipe 18C from the accumulator 131 flows into the pipes 5L, 5R through the scram valve 11, the pipes 18L, 18R and the gate valves 17L, 17R, and is supplied to the control rod drive mechanisms 3L, 3R through the pipes 5L, 5R.

The solenoid valve 14 for supplying purge water is connected to the pipe 18C between the downstream side of the scram valve 11 and a branch point of the pipe 18C. The purge water supplied to the pipe 18C from an external purge water supply source (not shown) flows into the pipes 5L, 5R from the pipe 18C through the pipes 18L, 18R and the gate valves 17L, 17R and is supplied to the control rod drive mechanisms 3L, 3R through the pipes 5L, 5R. The purge water flows out into the reactor pressure vessel RC through gaps (not shown) on the outer peripheral side of pistons 31 of the control rod drive mechanisms 3L, 3R. The supply of purge water prevents reactor water or crud from entering the inside of the control rod drive mechanisms 3L, 3R from the reactor pressure vessel RC side at the time of normal operation of the reactor.

At the time of emergency, the pressure relief valve 122 is switched and air pressing the diaphragm of the scram valve 11 in the valve closing direction is discharged from the pressure relief valve 122 to the outside as shown in FIG. 3. Accordingly, the scram valve 11 is opened to allow the pipe 18C to communicate with the branch pipes 18L, 18R.

At the same time as the opening of the scram valve 11, the pressure device 13 is operated. Accordingly, the high-pressure water inside the accumulator 131 flows into the branch pipes 18L, 18R from the pipe 18C through the scram valve 11, flows into the pipes 5L, 5R through the branch pipes 18L, 18R and the gate valves 17L, 17R, and is supplied to the control rod drive mechanisms 3L, 3R. As a result, the pistons 31 of the control rod drive mechanisms 3L, 3R rise and control rods 32 are inserted into the fuel assembly inside the reactor pressure vessel RC.

Figure 5:
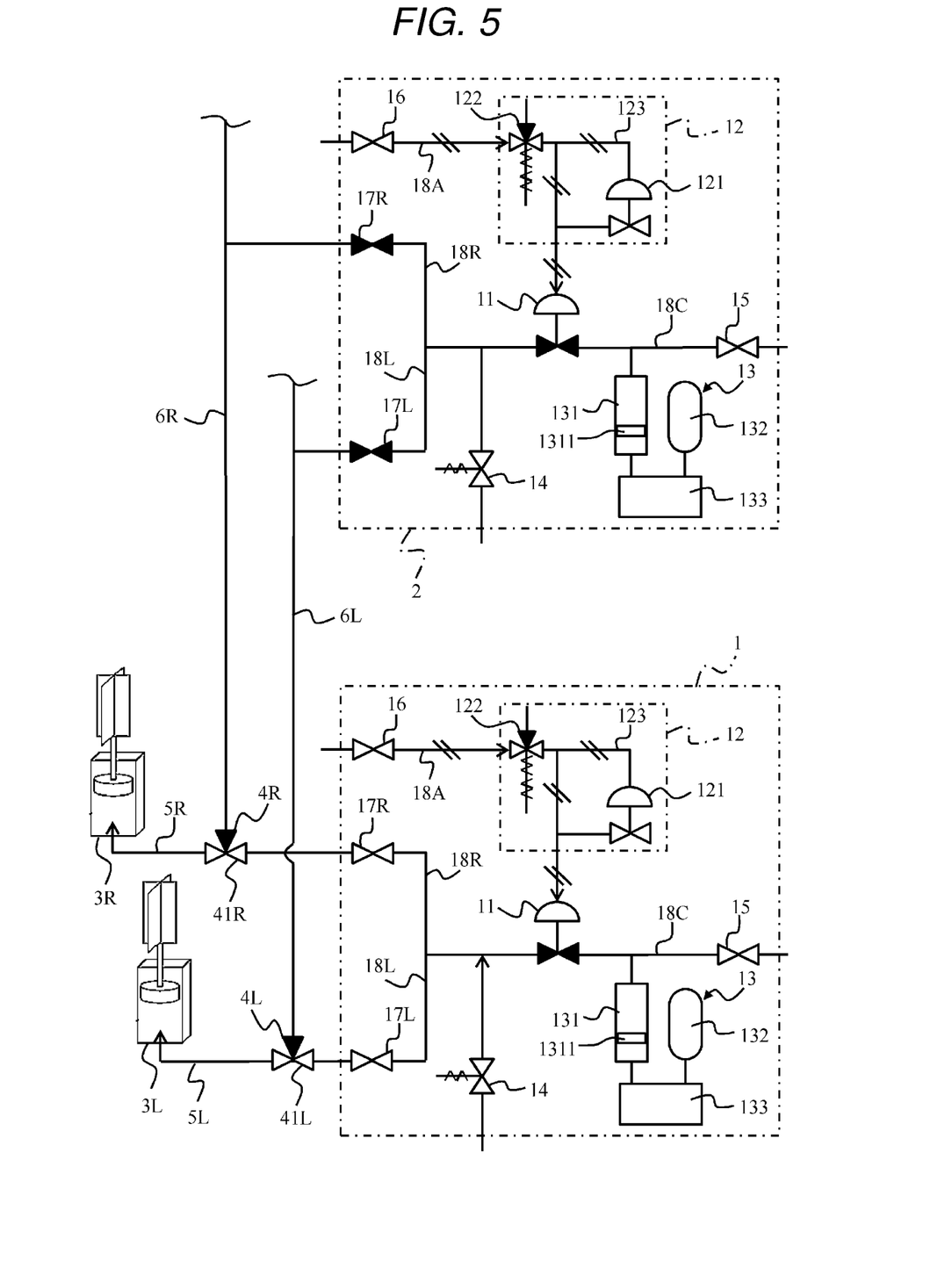
FIG. 5 is a system diagram at the time of normal operation, in which a hydraulic control unit for maintenance is connected to a hydraulic control unit as an inspection target.
Figure 6:
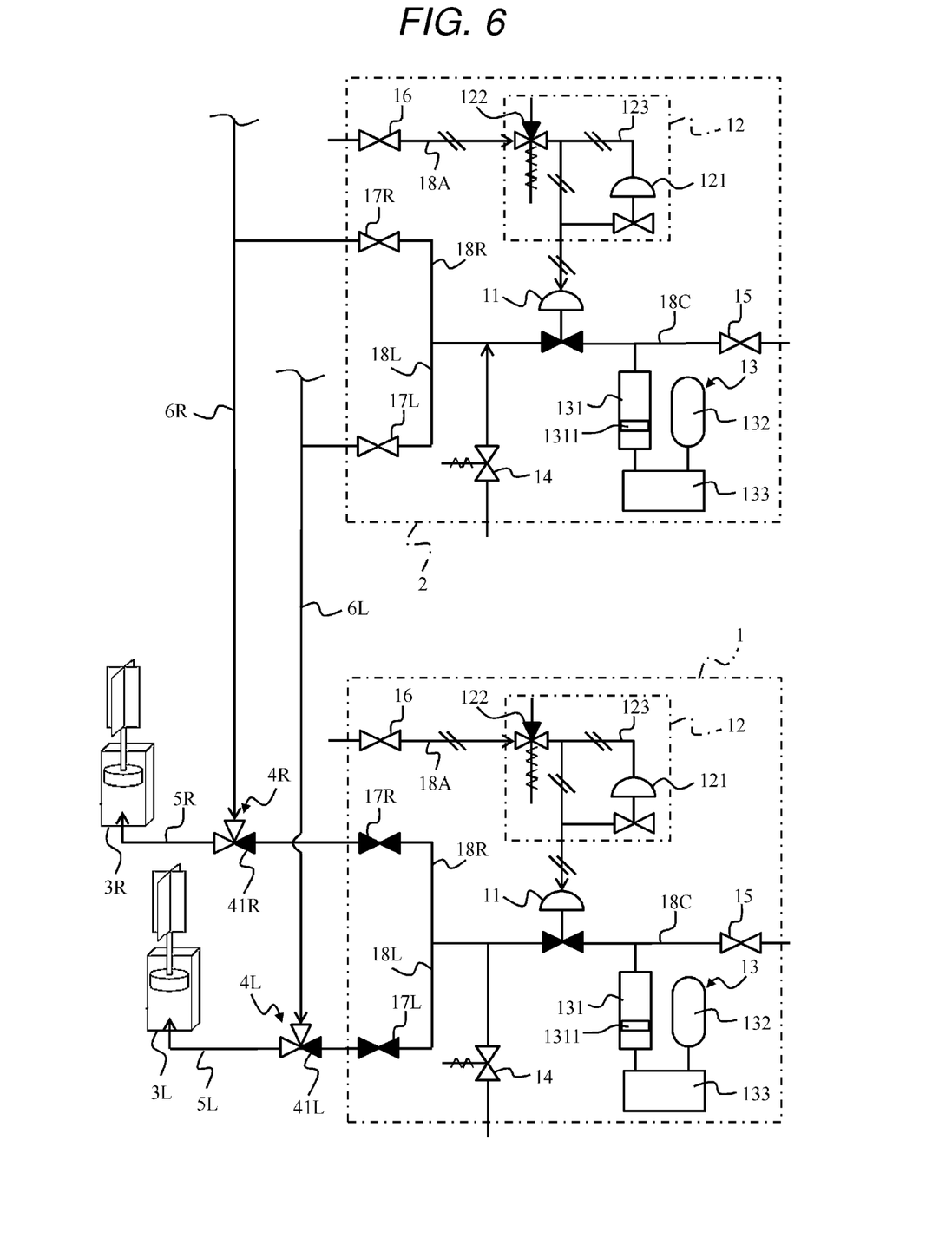
FIG. 6 is a system diagram at the time of inspection.

FIG. 5 and FIG. 6 show a state where the hydraulic control unit for maintenance 2 is connected to the normal hydraulic control unit 1 so as to be switchable. FIG. 5 is a system diagram at the normal operation. FIG. 6 is a system diagram at the time of inspection. The hydraulic control unit for maintenance 2 is configured in the same manner as the hydraulic control unit 1 as shown in FIG. 5, therefore, the detailed explanation thereof is omitted.

The hydraulic control unit for maintenance 2 is connected to the control rod drive mechanisms 3L, 3R in parallel through the given valve structures 4L, 4R provided in the middles of the pipes 5L. 5R and the pipes for maintenance 6L, 6R. The given valve structures 4L, 4R in the example are configured as the three-way selector valves 41L, 41R. In the following description, the three-way selector valves 41L, 41R may be abbreviated as the three-way selector valves 41 and the pipes for maintenance 6L, 6R may be abbreviated as the pipes for maintenance 6, respectively, when it is not particularly necessary to distinguish these components.

First inlets of the three-way selector valves 41 are connected to discharge ports of the hydraulic control unit 1. Second inlets of the three-way selector valves 41 are connected to discharge ports of the second hydraulic control unit 2 through the pipes for maintenance 6. Then, outlets of the three-way selector valves 41 are connected to the control rod drive mechanisms 3.

As shown in FIG. 5, the hydraulic control unit 1 and the control rod drive mechanisms 3 are connected through the three-way selector valves 41 at the normal operation. Therefore, the hydraulic control unit 1 secures the scram function of the control rod drive mechanisms 3.

On the other hand, when the hydraulic control unit 1 is inspected as shown in FIG. 6, the three-way selector valves 41 are switched by operating the three-way selector valves 41 manually or automatically to thereby connect the hydraulic control unit for maintenance 2 to the control rod drive mechanisms 3. Therefore, at the time of inspecting the hydraulic control unit 1, the hydraulic control unit for maintenance 2 secures the scram function of the control rod drive mechanisms 3.

At least one hydraulic control unit for maintenance 2 is provided so as to be switchable with respect to the plural hydraulic control units 1(1) to 1(n) as shown in FIG. 1 though not shown in FIG. 5 and FIG. 6.

Accordingly, the hydraulic control unit for maintenance 2 can be connected to the control rod drive mechanism 3 corresponding to the hydraulic control unit 1 as an inspection target only by performing switching operation to the valve mechanisms 4 (three-way selector valves 41) corresponding to an arbitrary hydraulic control unit 1 as the inspection target. Accordingly, it is possible to inspect the hydraulic control unit 1 as the inspection target while securing the scram function of the hydraulic control unit 1 as the inspection target by the hydraulic control unit for maintenance 2.

As described above, the hydraulic control unit for maintenance 2 is connected in the middles of the pipes 5 connecting between the hydraulic control unit 1 and the control rod drive mechanisms 3 through the three-way selector valves 41, and the connection is switched by the three-way selector valves 41, thereby inspecting the first hydraulic control unit as the inspection target while securing the scram function by the hydraulic control unit for maintenance 2 according to the example.

As the hydraulic control unit for maintenance 2 can secure the scram function of the control rod drive mechanisms 3 according to the example, it is possible to prevent the control rod drive mechanisms 3 from being stuck or from being inoperative at the time of inspecting the hydraulic control unit 1 and it is possible to inspect the hydraulic control unit 1 during an operation period of the reactor. As the inspection during the operation period of the reactor can be performed according to the example, an operator can secure sufficient inspection time without constraints of safety regulations. Furthermore, there is no complication with other works, therefore, it is possible to suppress the occurrence of troubles such as mixing of foreign material at the time of disassembling the system or assembling the system again.

Also according to the example, the purge water can be constantly supplied from the hydraulic control unit for maintenance 2 to the control rod drive mechanisms 3 at the time of inspecting the hydraulic control unit 1 as shown in FIG. 6, therefore, it is possible to prevent reactor water or crud from the reactor which may be a factor that interrupts driving of the control rod drive mechanisms 3 from entering the control rod drive mechanisms 3 during inspection work of the hydraulic control unit 1.

Further according to the example, the hydraulic control unit for maintenance 2 secures the scram function while the hydraulic control unit 1 and the control rod drive mechanisms 3 corresponding to the hydraulic control unit 1 are inspected, therefore, the hydraulic control unit for maintenance 2 allows the control rods 11 to perform scram operation to maintain an insertion state of the control rods 11 even when the control rods 11 fall due to some reasons. As a result, the safety of the reactor can be further improved.

Example 2

A second example will be explained with reference to FIG. 7 and FIG. 8. The difference from the first example will be mainly described in the following respective examples including this example. In the example, tees 42 and passage selector gate valves 43 are used as given valve structures 4 (2) for connecting the hydraulic control unit for maintenance 2 to the pipes 5. When valve structures 4L (2) and 4R (2) may be abbreviated as valve structures 4 (2) when they are not distinguished.

Figure 7:
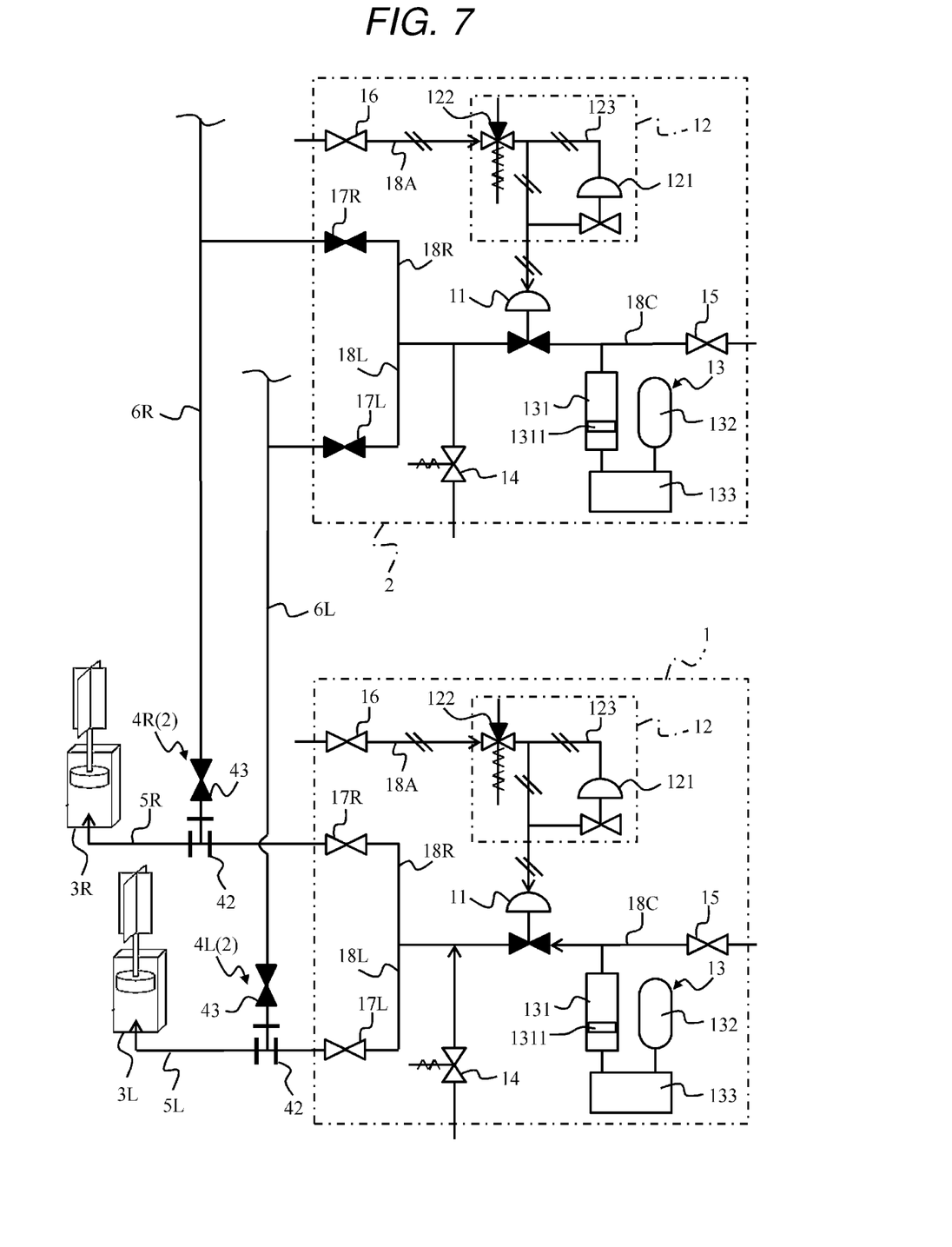
FIG. 7 is a system diagram at the time of normal operation according to a second example, in which a hydraulic control unit for maintenance is connected to a hydraulic control unit as an inspection target.

FIG. 7 is a system diagram of a control rod drive system according to the example. In the example, the hydraulic control unit for maintenance 2 is connected through the tees 42 and the passage selector gate valves 43 between the hydraulic control unit 1 and the control rod drive mechanisms 3.

The tee 42 has three openings. A first opening is connected to the discharge port of the hydraulic control unit 1. A second opening is connected to the discharge port of the hydraulic control unit for maintenance 2 though the passage selector gate valve 43. A third opening is connected to the control rod drive mechanism 3.

FIG. 7 shows a state at the time of normal operation. In the normal operation, respective passage selector gate valves 43 provided between all the hydraulic control units 1 and the hydraulic control unit for maintenance 2 are in the closed state, respectively. Accordingly, the hydraulic control unit for maintenance 2 is separated from the control rod drive system.

Furthermore, at the normal operation, when the gate valves 17 of respective hydraulic control units 1 are in the open state respectively, respective hydraulic control units 1 secure the scram function of respective corresponding control rod drive mechanisms 3.

Figure 8:
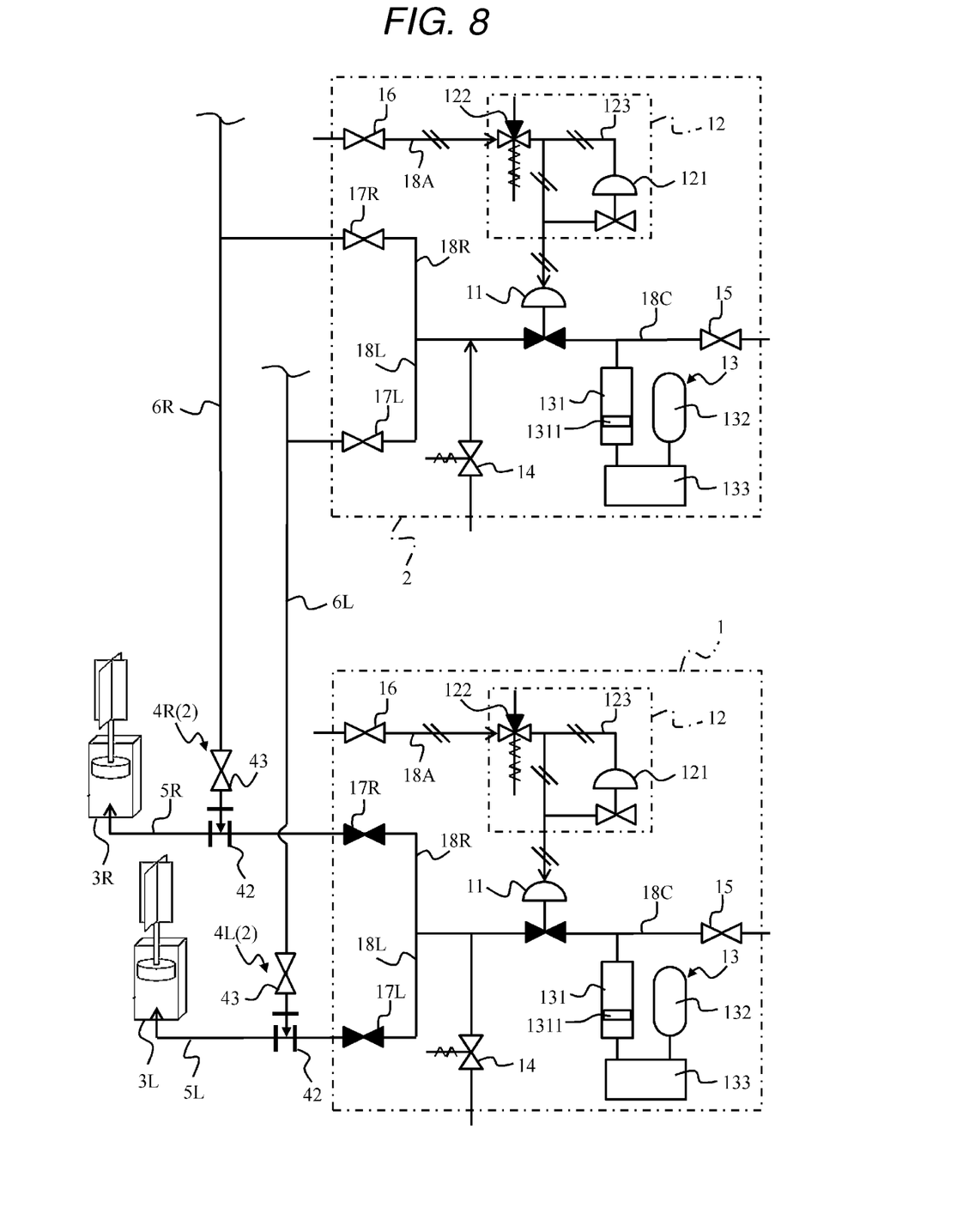
FIG. 8 is a system diagram at the time of inspection.

FIG. 8 shows a state at the time of inspecting the hydraulic control unit 1. The gate valves 17 of hydraulic control unit 1 of an inspection target are closed and the passage selector gate valves 43 are opened. This work may be performed by the operator manually or may be automatically performed by using valves which can be remotely operated. When the gate valves 17 are closed, the hydraulic control unit 1 as the inspection target is separated from the control rod drive system. Then, when the passage selector gate valves 43 are opened, the hydraulic control unit for maintenance 2 is connected to the control rod drive system instead of the hydraulic control unit 1 as the inspection target.

Accordingly, the hydraulic control unit for maintenance 2 secures the scram function of the control rod drive mechanisms corresponding to the hydraulic control unit 1 as the inspection target during the inspection of the hydraulic control unit 1 as the inspection target.

Furthermore, the valve structures 4 (2) including the tees 42 and the passage selector gate valves 43 are respectively provided between the hydraulic control unit for maintenance 2 and other hydraulic control units 1 and the control rod drive mechanisms 3. Accordingly, it is possible to connect the hydraulic control unit for maintenance 2 and the hydraulic control unit 1 as the inspection target to the control rod drive system by switching between them only by respectively operating the gate valves 17 and the passage selector gate valves 43 of the hydraulic control unit 1 in which inspection is necessary.

The present example having the above configuration has the same operation and effect as those of the first example. Furthermore, the valve structure 4 (2) including the tee 42 and the passage selector gate valve 43 is used in the example, therefore, the separation function possessed by the gate valve 17 can be given to the passage selector gate valve 43. As a result, the present example is superior to the first embodiment in versatility.

Example 3

A third example will be explained with reference to FIG. 9 and FIG. 10. Given valve structures 4 (3) in the example are connected to maintenance pipes 6 through flange joints 44. Each flange joint 44 can be provided at a tip end of either the three-way selector valve 41 or the tee 42. In the example, a case in which the flange joint 44 is provided at the tip end of a branch of the three-way selector valve 41 will be explained as an example.

Figure 9:
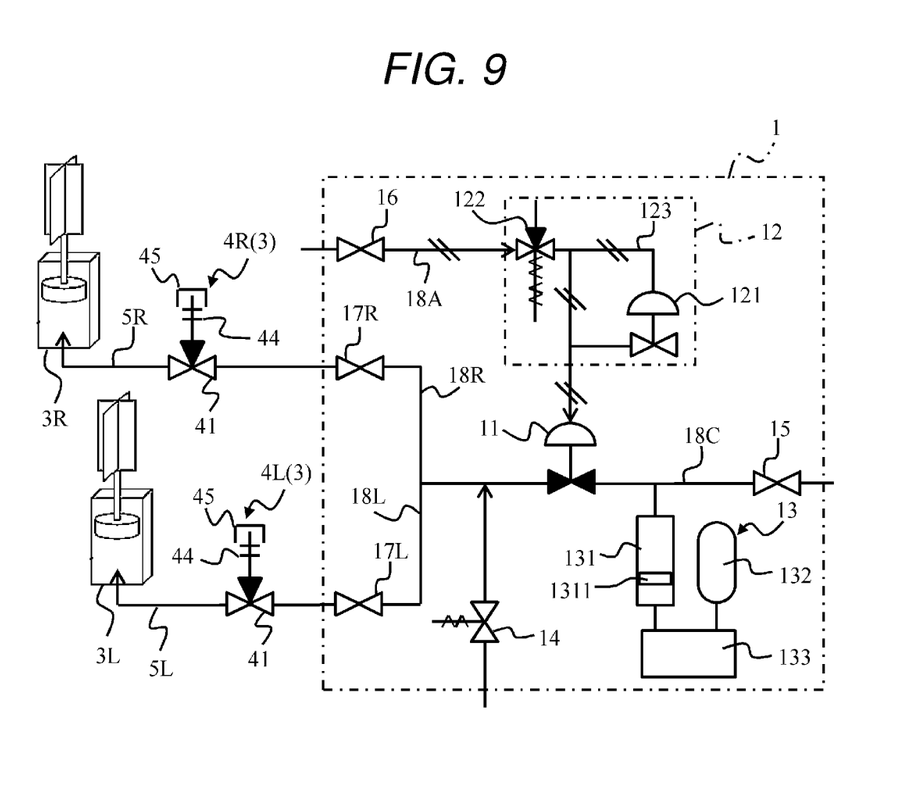
FIG. 9 is a system diagram at the time of normal operation according to a third example, in which a hydraulic control unit for maintenance is connected to a hydraulic control unit as an inspection target.

As shown in FIG. 9, opening ends of the flange joints 44 are closed by blank flanges 45 at the time of normal operation of the hydraulic control unit 1.

Figure 10:
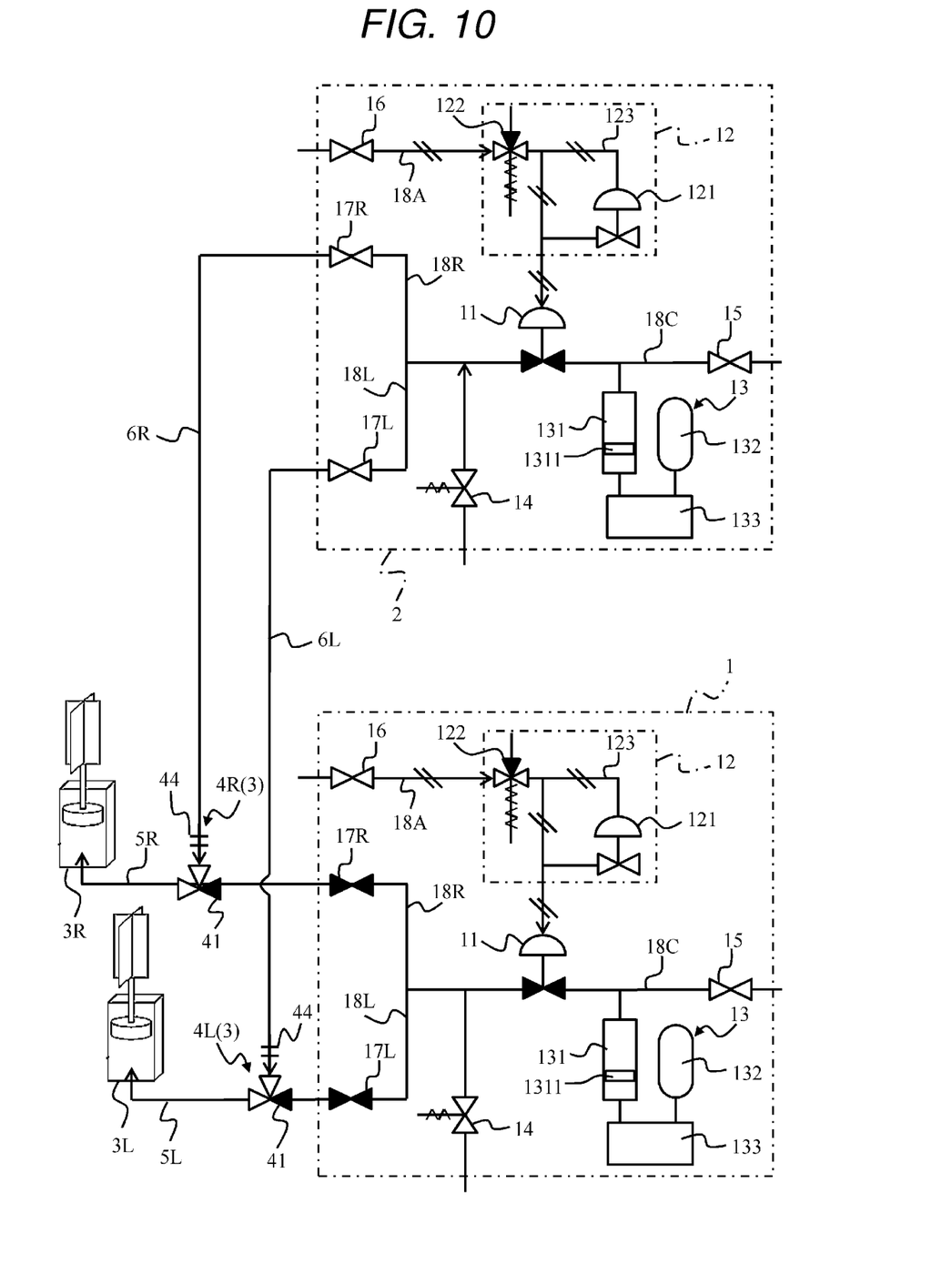
FIG. 10 is a system diagram at the time of inspection.

On the other hand, at the time of inspecting the hydraulic control unit 1, the blank flanges 45 are removed as shown in FIG. 10 and the flange joints 44 are fastened to flange joints provided at tip ends of the maintenance pipes 6.

After that, the three-way selector valves 41 are switched and the hydraulic control unit for maintenance 2 is connected to the control rod drive mechanisms 3. Accordingly, the hydraulic control unit for maintenance 2 secures the scram function of the control rod drive mechanisms 3 corresponding to the hydraulic control unit 1 of the inspection target.

After the end of the inspection of the hydraulic control unit 1, the three-way selector valves 41 are switched and the hydraulic control unit 1 is connected to the control rod drive mechanisms 3 again. Then, the maintenance pipes 6 connecting to the hydraulic control unit for maintenance 2 are separated at the flange joints 44 and the flange joints 44 are closed by the blank flanges 45.

The present example having the above configuration has the same operation and effect as those of the first example or the second example. Furthermore, the flange structures 44 are provided in respective hydraulic control units 1 in the example, therefore, the hydraulic control unit for maintenance 2 can be connected to an arbitrary hydraulic control unit 1 relatively easily, which improves efficiency of inspection work.

Also in the example, the hydraulic control unit for maintenance 2 can be configured so as to move by providing, for example, a hand-truck function under the frame 10, thereby moving the hydraulic control unit for maintenance 2 close to the hydraulic control unit 1 as the inspection target to be connected to the pipes 5 in each inspection. It is not necessary to arrange pipes for connecting the fixed-type hydraulic control unit for maintenance 2 to respective hydraulic control units 1 due to the moveable hydraulic control unit for maintenance 2 and the flange structures 44 of respective hydraulic control units 1, which can simplify connection work between the hydraulic control units 1 and the hydraulic control unit for maintenance 2.

The present invention is not limited to the above embodiment and various modification examples are included. The embodiment has been explained in detail for explaining clearly, which is not always limited to the embodiment including the all explained configurations. It is possible to replace part of a configuration of a certain embodiment with a configuration of another embodiment. It is also possible to add a configuration of another embodiment to a configuration a certain embodiment. It is further possible to perform addition, deletion and replacement of another configuration with respect to part of configurations of respective embodiments.

Technical features included in the above embodiments are not limited to combinations defined in claims, and may be suitably combined.

What is claimed is:

1. A control rod drive system controlling operation by supplying a hydraulic pressure to control rod drive mechanisms, comprising:
   a plurality of first hydraulic control units;
   a plurality of control rod drive mechanisms respectively corresponding to the plurality of first hydraulic control units;
   a second hydraulic control unit, which has a same configuration as the plurality of first hydraulic control units;
   first piping connecting each first hydraulic control unit with each respectively corresponding control rod drive mechanism; and a plurality of valves, each on a flow path of the first piping, wherein the second hydraulic control unit is connected to each control rod drive mechanism via second piping that is connected to each of the plurality of valves, wherein water does not flow directly between the second hydraulic control unit and any of the first hydraulic control units, and wherein a flow path of supplying hydraulic pressure to a control rod drive mechanism is switched from a respective first hydraulic control unit to the second hydraulic control unit via a valve.

2. The control rod drive system according to claim 1, wherein each a three-way selector valve, and a first inlet of each three-way selector valve is connected to a respective discharge port of a respective first hydraulic control unit, a second inlet of each three-way selector value is connected to a respective discharge port of the second hydraulic control unit, and an outlet of each three-way selector valve is connected to a respective control rod drive mechanism.

3. The control rod drive system according to claim 1, wherein each valve includes a tee and a gate valve, and a first opening of each tee is connected to a respective discharge port of the first hydraulic control unit, a second opening of each tee is connected to a respective discharge port of the second hydraulic control unit though the gate valve, and a third opening of each tee is connected to a respective given control rod drive mechanism.

4. The control rod drive system according to claim 1, wherein the second hydraulic control unit is detachably connected to each valve.

5. The control rod drive system according to claim 4, wherein the second hydraulic control unit is detachably connected to each valve through flange joints.

6. The control rod drive system according to claim 5, wherein the second hydraulic control unit is mobile upon disconnection from the valves.

7. The control rod drive system according to claim 1, wherein each first hydraulic control unit and the second hydraulic control unit each comprise:
an air operated scram valve,
a scram pilot valve that opens/closes the scram valve,
downstream-side gate valves positioned on a downstream side of the scram valve,
an upstream-side gate valve positioned on an upstream side of the scram valve,
a pressure device positioned between the scram valve and the upstream-side gate valve and configured to pressurize an internal pipe, and
a solenoid valve positioned between the scram valve and the downstream-side gate valves and configured to supply purge water.

8. The control rod drive system according to claim 2, wherein each first hydraulic control unit and the second hydraulic control unit each comprise:
an air operated scram valve,
a scram pilot valve that opens/closes the scram valve,
downstream-side gate valves positioned on a downstream side of the scram valve,
an upstream-side gate valve positioned on an upstream side of the scram valve,
a pressure device positioned between the scram valve and the upstream-side gate valve and configured to pressurize an internal pipe, and
a solenoid valve positioned between the scram valve and the downstream-side gate valves and configured to supply purge water.

9. The control rod drive system according to claim 3, wherein each first hydraulic control unit and the second hydraulic control unit each comprise:
an air operated scram valve,
a scram pilot valve that opens/closes the scram valve,
downstream-side gate valves positioned on a downstream side of the scram valve,
an upstream-side gate valve positioned on an upstream side of the scram valve,
a pressure device positioned between the scram valve and the upstream-side gate valve and configured to pressurize an internal pipe, and
a solenoid valve positioned between the scram valve and the downstream-side gate valves and configured to supply purge water.

10. The control rod drive system according to claim 4, wherein each first hydraulic control unit and the second hydraulic control unit each comprise:
an air operated scram valve,
a scram pilot valve that opens/closes the scram valve,
downstream-side gate valves positioned on a downstream side of the scram valve,
an upstream-side gate valve positioned on an upstream side of the scram valve,
a pressure device positioned between the scram valve and the upstream-side gate valve and configured to pressurize an internal pipe, and
a solenoid valve positioned between the scram valve and the downstream-side gate valves and configured to supply purge water.

11. The control rod drive system according to claim 5, wherein each first hydraulic control unit and the second hydraulic control unit each comprise:
an air operated scram valve,
a scram pilot valve that opens/closes the scram valve,
downstream-side gate valves positioned on a downstream side of the scram valve,
an upstream-side gate valve positioned on an upstream side of the scram valve,
a pressure device positioned between the scram valve and the upstream-side gate valve and configured to pressurize an internal pipe, and
a solenoid valve positioned between the scram valve and the downstream-side gate valves and configured to supply purge water.

12. The control rod drive system according to claim 6, wherein each first hydraulic control unit and the second hydraulic control unit each comprise:
an air operated scram valve,
a scram pilot valve that opens/closes the scram valve,
downstream-side gate valves positioned on a downstream side of the scram valve,
an upstream-side gate valve positioned on an upstream side of the scram valve,
a pressure device positioned between the scram valve and the upstream-side gate valve and configured to pressurize an internal pipe, and
a solenoid valve positioned between the scram valve and the downstream-side gate valves and configured to supply purge water.

\* \* \* \* \*